United States Patent
Shivamoggi et al.

(10) Patent No.: US 11,574,236 B2
(45) Date of Patent: Feb. 7, 2023

(54) AUTOMATING CLUSTER INTERPRETATION IN SECURITY ENVIRONMENTS

(71) Applicant: Rapid7, Inc., Boston, MA (US)

(72) Inventors: Vasudha Shivamoggi, Cambridge, MA (US); Roy Hodgman, Cambridge, MA (US); Wah-Kwan Lin, Melrose, MA (US)

(73) Assignee: Rapid7, Inc., Boston, MA (US)

( * ) Notice: Subject to any disclaimer, the term of this patent is extended or adjusted under 35 U.S.C. 154(b) by 925 days.

(21) Appl. No.: 16/214,309

(22) Filed: Dec. 10, 2018

(65) Prior Publication Data

US 2020/0184367 A1 Jun. 11, 2020

(51) Int. Cl.
*G06N 20/00* (2019.01)
*G06K 9/62* (2022.01)
*H04L 9/40* (2022.01)
*G06F 16/28* (2019.01)
*G06N 5/04* (2006.01)

(52) U.S. Cl.
CPC .......... *G06N 20/00* (2019.01); *G06F 16/285* (2019.01); *G06K 9/6221* (2013.01); *G06N 5/048* (2013.01); *H04L 63/205* (2013.01)

(58) Field of Classification Search
None
See application file for complete search history.

(56) References Cited

U.S. PATENT DOCUMENTS

| | | | |
|---|---|---|---|
| 10,170,135 B1* | 1/2019 | Pearce | H04R 29/00 |
| 2019/0180175 A1* | 6/2019 | Meteer | G10L 15/26 |
| 2021/0117858 A1* | 4/2021 | Ajiro | G05B 23/02 |

* cited by examiner

*Primary Examiner* — David R Vincent
(74) *Attorney, Agent, or Firm* — Ashwin Anand

(57) ABSTRACT

Disclosed herein are methods, systems, and processes to automate cluster interpretation in computing environments to develop targeted remediation security actions. To interpret clusters that are generated by a clustering methodology without subjecting clustered data to classifier-based processing, separation quantifiers that indicate a spread in feature values across clusters are determined and used to discover relative feature importances of features that drive the formation of clusters, permitting a security server to identify features that discriminate between clusters.

20 Claims, 7 Drawing Sheets

| | | Cluster Interpretation Table 305 | | | |
|---|---|---|---|---|---|
| Dataset Field 310 | Computing Assets Field 315 | Cluster Field 320 | Features Field 325 | Separation Quantifier Field 330 | Feature Importances Field 335 | Cluster Interpretation Field 340 |
| Dataset 345(1) | 140(1) 140(4) 140(5) | Cluster 350(1) Cluster 350(2) | Feature 355(1) Feature 355(2) | 350(1): 355(1) – $d_{11}$ 355(2) – $d_{12}$ | 350(2): 355(1) – $d_{21}$ 355(2) – $d_{22}$ | 355(1): 0.7 355(2): 0.3 | Feature 355(1) is more than twice as important to cluster 350(1) as feature 355(2) is to cluster 350(2) |
| Dataset 345(2) | 140(1) 140(4) 140(5) 140(7) 140(9) | Cluster 350(1) Cluster 350(2) | Feature 355(1) Feature 355(2) | 350(1): 355(1) – $d_{11}$ 355(2) – $d_{12}$ | 350(2): 355(1) – $d_{21}$ 355(2) – $d_{22}$ | 355(1): 0.3 355(2): 0.7 | Feature 355(2) is almost twice as important to cluster 350(2) as features 355(2) is to cluster 350(1) |
| ... | ... | ... | ... | ... | ... | ... |

FIG. 3

AUTOMATING CLUSTER INTERPRETATION IN SECURITY ENVIRONMENTS

BACKGROUND

Field of the Disclosure

This disclosure is related to computer and network security. In particular, this disclosure is related to automating cluster interpretation in security environments.

Description of the Related Art

Modern enterprises collect vast amounts of data associated with their networks as well as user and computing device interactions within such networks to implement and provision offensive and defensive cybersecurity measures. For example, such security data is crucial to the performance of vulnerability management, incident detection, penetration testing, and other security operations. However, evaluating a significant amount of collected security data to gain a deeper understanding of computing device interactions and user behavior as well as generate actionable cybersecurity intelligence is a daunting computational task.

Clustering involves the organization of unlabeled data (e.g., raw data) into similarity groups called clusters. A cluster is a collection of data items which are similar between them and dissimilar to data items in other clusters. Clustering requires a proximity measure (e.g., a similarity measure or a dissimilarity (or distance) measure), a criterion function to evaluate a clustering, and an algorithm to compute clustering (e.g., by optimizing the criterion function). Therefore, clustering is useful to analyze raw data to assess similarities and differences.

Unfortunately, although clustering is useful to determine similarities and differences in a given data set, clustering does not provide a method to define the basis on which clusters are formed. Therefore, clustering does not provide a reliable method to determine why certain data items end up in a given cluster versus another cluster without requiring subjecting the data set to further laborious and computer resource-intensive data processing (e.g., using a classifier).

SUMMARY OF THE DISCLOSURE

Disclosed herein are methods, systems, and processes for automating cluster interpretation in security environments. One such method involves at least accessing a dataset, executing a clustering methodology on the dataset, determining a separation quantifier that indicates a degree of variance for features shared by each cluster generated by the clustering methodology, and determining a feature importance of each feature for each cluster.

In certain embodiments, the dataset includes data points and the execution of the clustering methodology generates a cluster label for each data point. In this example, the method determines a centroid value for each cluster and determines the separation quantifier by at least (a) selecting a first cluster and a first feature of the first cluster, (b) defining a base value of the first cluster based on a first centroid value of the first cluster in the first feature, (c) determining a separation value between the base value and centroid values for the first feature in each cluster other than the first cluster, and (d) determining a relative feature importance of each feature for the first cluster by repeating steps (a), (b), and (c) for each feature other the first feature.

In one embodiment, the method involves normalizing the relative feature importance of each feature to determine the feature importance of each feature and determining the separation value by replacing a mean value of the first cluster with the base value of the first cluster to configure a targeted remediation action. In this example, at least one feature quantifies whether a cluster is secure based on the number of computing devices with up-to-date patching.

In another embodiment, a system in a cybersecurity computing environment is configured to perform a targeted remediation security action by accessing a dataset of raw data with data points, each of which are associated with an identity of a computing device operating in the cybersecurity computing environment and subject to a potential targeted remediation security action. After processing the dataset with an (unsupervised) clustering methodology, the system determines a separation quantifier that indicates a degree of variance for features shared by each cluster generated by the clustering methodology, for example, by determining a standard deviation of each cluster (e.g., other/remaining clusters other than a selected cluster) by replacing a mean value of the selected cluster with a base value of the selected cluster and determining a feature importance of each feature for each cluster.

In some embodiments, the system determines whether a selected feature separates the selected cluster from each (other/remaining) cluster other than the selected cluster based on the degree of variance and a corresponding feature importance of the selected feature and configures the targeted remediation security action based on the corresponding feature importance enumerated by the degree of variance between the features shared by the selected cluster and one or more other/remaining clusters.

In other embodiments, at least one feature is a binary feature and is a security vulnerability associated with one or more computing devices. In this example, configuring the targeted remediation security action includes an unsupervised clustering methodology followed by a supervised classification methodology performed without using a classifier.

In certain embodiments, the system determines the separation quantifier by selecting the selected cluster and a selected feature of the selected cluster, determining a centroid value for the selected cluster, defining the base value of the selected cluster based on the centroid value of the selected cluster in the selected feature, where the base value of the selected cluster is the centroid value of the selected cluster in the selected feature, determining a separation value between the base value and centroid values for the selected feature in each cluster other than the selected cluster, and determining a relative feature importance of the selected feature based on a coefficient measure assigned to the selected feature.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings and/or figures.

FIG. 3 is a table 300 to automate cluster interpretation in security environments, according to one embodiment of the present disclosure.

Figure 1:
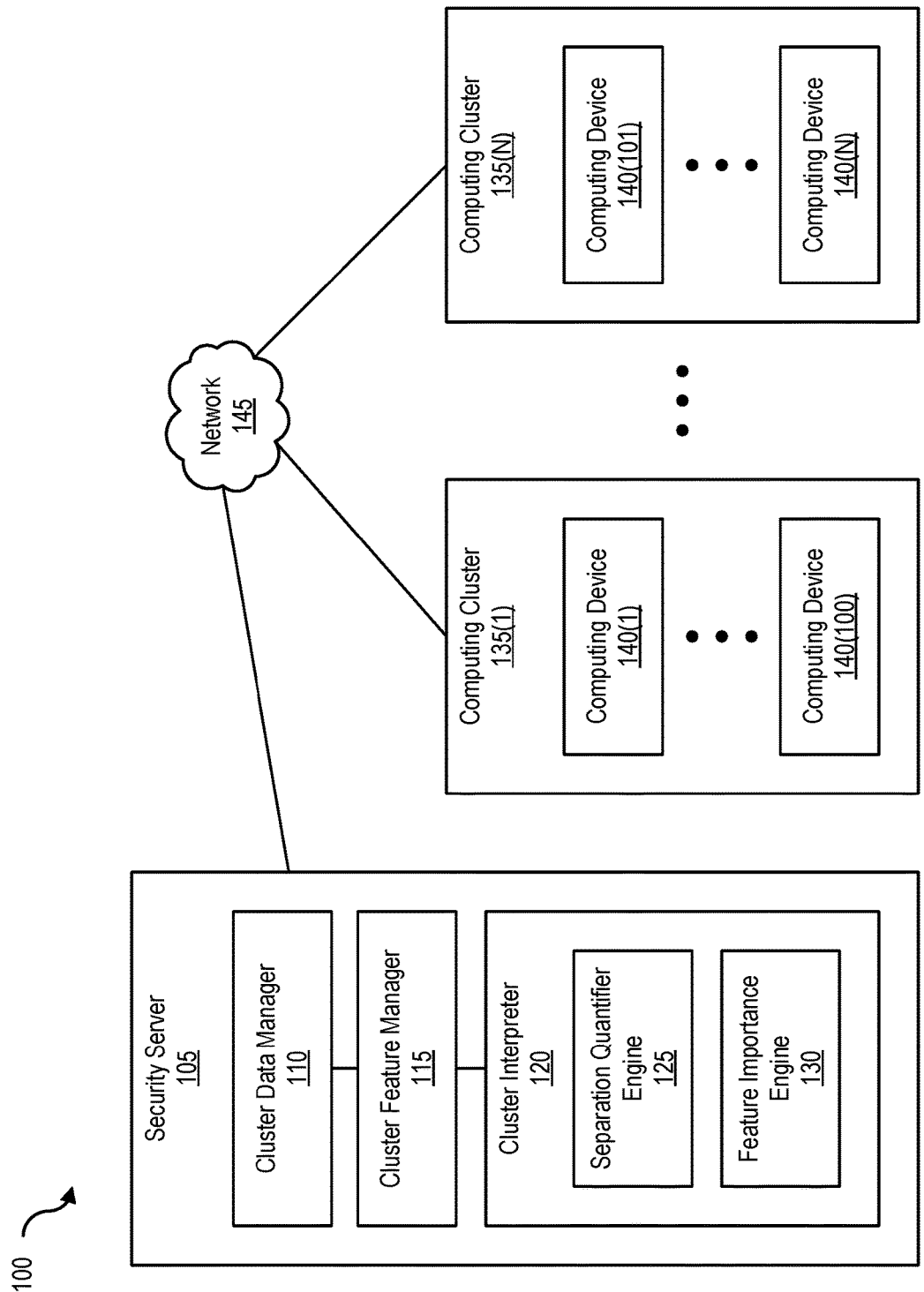
FIG. 1 is a block diagram 100 of a security server that automates cluster interpretation, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Actionable data is at the heart of modern cybersecurity. The effective implementation of cybersecurity tools such as vulnerability management (VM) and incident detection and response (IDR) systems in modern computing environments requires timely and meaningful analysis of massive datasets to glean valuable security data-related intelligence. For example, security data about malicious attackers such as their techniques, incentives, and attack mechanisms as well as current and historical user computing behavior can be collected and used to optimize the operation of situation-aware intrusion detection systems that handle persistent threats.

To facilitate the foregoing, modern businesses collect vast amounts of data associated with their networks as well as user and computing device interactions within such networks to implement and provision offensive and defensive cybersecurity measures because such security data is crucial to the effective performance of vulnerability management, incident detection, penetration testing, and other security systems. Therefore, a data driven approach that can analyze a significant amount of network and user data in a timely manner to generate actionable cybersecurity intelligence is of paramount importance in modern cybersecurity.

Clustering involves the grouping of a dataset with raw data into similarity sets called clusters. A cluster is a collection of data points which are more similar between them and dissimilar to data points in other clusters (generated by the same clustering process). Clustering requires a proximity measure (e.g., a similarity measure $s(x_i,x_k)$: large if $x_i,x_k$ are similar or a dissimilarity (or distance) measure $d(x_i,x_k)$: small if $x_i,x_k$ are similar), a criterion function to evaluate a clustering (e.g., whether the clustering is a good clustering or a bad clustering), and a clustering methodology (e.g., an algorithm) to compute clustering (e.g., by optimizing the criterion function).

Cybersecurity tools can use clustering to analyze the aforementioned vast amounts of security data to identify specific computing devices and associated computing behaviors (from both a user and/or attacker perspective) and determine whether certain security actions or operations should be taken (either proactively or prescriptively). Unfortunately, existing cybersecurity tools that implement clustering for security data analysis suffer from several shortcomings related to cluster interpretation in such computing environments.

Cluster interpretation is a challenging technology-related problem when a large amount of data is involved. For example, cluster data analysis includes intra-cluster cohesion (compactness) that measures how near data points in a cluster are to a cluster centroid and inter-cluster separation (isolation) that measures how far away cluster centroids are from each other. In many scenarios, particularly those where vast amounts of complex data is involved, such cluster evaluation still requires subject matter expertise and judgment. In the cybersecurity context, given the seriousness of potential malicious attacks and the urgent need for actionable intelligence, such time consuming and resource-intensive evaluation is extremely undesirable.

Regrettably, although existing cybersecurity tools that implement clustering for security data analysis can be used to arbitrarily determine similarities and differences in a given data set, such tools do not provide a conceivable method to define the basis on which clusters are formed without requiring the data set to be subjected to further laborious and computer resource-intensive data processing (e.g., using a classifier). The importance of determining the basis on which clusters are formed in the cybersecurity context while minimizing (or even eliminating) further time consuming data processing is prescient not only because of the urgency of such analysis, but also because determining why certain computing devices end up in a given cluster versus another cluster is crucial to taking time sensitive security action.

Disclosed herein are methods, systems, and processes to automate cluster interpretation in security environments.

Example Security Server to Automate Cluster Interpretation

FIG. 1 is a block diagram 100 of a security server 105 that automates cluster interpretation of computing clusters 135 (1)-(N), according to one embodiment. Security server 105 can be any type of physical or virtual computing device and includes at least a cluster data manager 110, a cluster feature manager 115, and a cluster interpreter 120. Cluster interpreter 120 includes at least a separation quantifier engine 125 and a feature importance engine 130. Security server 105 is communicatively coupled to computing clusters 135 (1)-(N) via network 145 (or any other type of interconnection). Computing cluster 135(1) includes computing devices 140(1)-(100) and computing cluster 135(N) includes computing device 140(101)-(N), each of which can be any type of physical or virtual computing devices.

Cluster data manager 110 receives security data associated with computing devices 140(1)-(N) from computing clusters 135(1)-(N) via network 145 and maintains the identity of each computing device as a data point (e.g., as part of in one or more datasets). Examples of security data managed by cluster data manager 110 include but are not limited to dangerous user behavior data, threat probing data, threat movement data, remote entry data, failed access attempt data, malicious behavior on asset level data, suspicious behavior on asset level data, malicious behavior on network level data, account adjustment data, and the like.

Cluster feature manager 115 maintains and manages one or more features used to evaluate and interpret datasets that include data points associated with computing devices 140(1)-(N). A feature is a piece of data or information that can be useful for prediction. New input features can be created (e.g., for machine learning) to improve predictive models. Because a data set with a set of features, defined by a K number of clusters, can be clustered into K clusters, a feature acts as an attribute to determine why a particular data point ends up in a particular cluster.

As previously noted, clustering can be used to determine the similarity and differences between various data points in a dataset. However, evaluating and interpreting what each cluster represents (e.g., why certain data points end up in a given cluster versus another cluster) requires further resource-intensive analysis. Unfortunately, because the initial number of clusters (e.g., K) as well as the selected features are essentially arbitrary, merely clustering a given dataset may not provide actionable insight into which features are important to the dataset.

Several methods currently exist to isolate important features that vary the most across different clusters so that a subjective judgement can be made about a given cluster's profile. For example, a Random Forest Classifier or other classification models (e.g., a single multiclass classification model) can be used to glean which features are important for a particular prediction (e.g., whether an ingress from a disabled account is important to determine whether a given computing device has been compromised, whether brute force against a local account is important to determine that a given user has been compromised, and the like). Unfortunately, as previously noted, requiring such additional processing and analysis post-clustering when a large amount of data is involved is laborious, computing-resource intensive, and essentially prohibitive in cybersecurity computing environments.

Therefore, to optimize and automate cluster interpretation post-clustering, security server 105 implements cluster interpreter 120. In one embodiment, cluster interpreter 120 accesses a dataset generated and/or maintained by cluster data manager 110 and executes a clustering methodology on the dataset (e.g., K-Means, DBSCAN, and the like). Separation quantifier engine 125 then determines a separation quantifier that indicates a degree of variance for one or more features shared by each cluster generated by the clustering methodology and feature importance engine 130 determines a feature importance of each feature for each (generated) cluster.

In some embodiments, separation quantifier engine 125 determines the separation quantifier by (1) selecting a cluster and a feature of the cluster (e.g., cluster K1 and feature "malicious hash on asset"), (2) defining a base value of the cluster (where the base value is the centroid value of the cluster in the given feature), (3) determining a separation value between the base value and centroid values for the feature in other (remaining) clusters (e.g., by replacing a mean value of the cluster with the defined base value), and (4) determining a relative feature importance of each feature for the cluster by repeating steps (1), (2), and (3) for each (remaining) feature. Feature importance engine 130 then normalizes the relative feature importance of each feature to determine the feature importance of each feature. Finally, cluster interpreter 120 configures a targeted remediation security action (e.g., device isolation, and the like) if the feature importance of each feature indicates a (given) variance between each cluster (e.g., based on a predetermined coefficient or a variance threshold).

Example of Automating Cluster Interpretation in Security Environments

Figure 2:
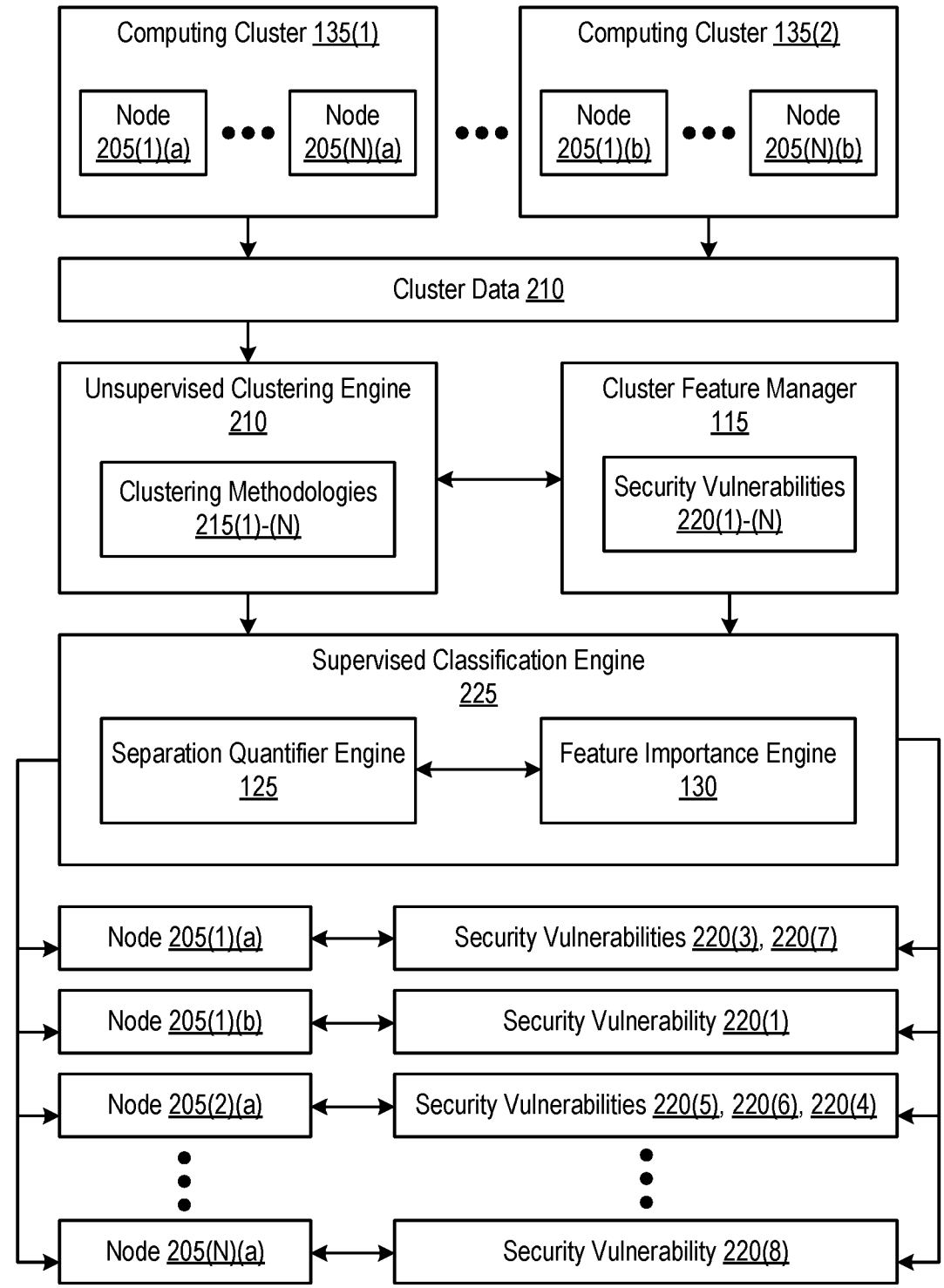
FIG. 2 is a block diagram 200 of a computing system that automates cluster interpretation based on security vulnerabilities, according to one embodiment of the present disclosure.

FIG. 2 is a block diagram 200 of a computing system that automates cluster interpretation based on security vulnerabilities in cybersecurity computing environments, according to one embodiment. Computing cluster 135(1) includes nodes 205(1)(a)-205(N)(a) and computing cluster 135(2) includes nodes 205(1)(b)-205(N)(b). Nodes 205(1)(a)-205(N)(a) and nodes 205(1)(b)-205(N)(b) generate cluster data 210 (e.g., maintained and managed by cluster data manager 110). Cluster data 210 (e.g., in the form of one or more datasets) is processed by an unsupervised clustering engine 210 using one or more of clustering methodologies 215(1)-(N) (e.g., algorithms such as K-Means, Agglomerative, Mean-Shift, Density-based spatial clustering of applications with noise (DBSCAN), Expectation Maximization (EM), and the like).

In one embodiment, cluster feature manager 115 introduces one or more features (e.g., security vulnerabilities 220(1)-(N) to cluster data 210 being processed by unsupervised clustering engine 210. Examples of such security vulnerability-related features include, but are not limited to account visits suspicious link, password set to never expire, network access for threat, asset connects to network honeypot, watched impersonation, account authenticated to critical asset, lateral movement domain credentials, lateral movement local credentials, suspicious authentication, wireless multiple country authentications, multiple country authentications, ingress from non-expiring account, ingress from ServiceAccount, service account authenticated from new source, account authenticated to critical asset from new source, new local user primary asset, ingress from disabled account, authentication attempt from disabled account, brute force against domain account, brute force against local account, brute force from unknown source, remote file execution, VirusAlert, log deletion local account, harvested credentials, log deletion, virus alert, network access for threat, malicious hash on asset, advanced malware alert, protocol poison, administrator impersonation, account privilege escalated, account enabled, account password reset, account located, DomainAdmin enabled, and the like.

In another embodiment, a supervised classification engine 225 (part of cluster interpreter 120) uses separation quantifier engine 125 to determine a separation quantifier. In this example, the separation quantifier indicates a degree of variance for features shared by each cluster generated by unsupervised clustering engine 210 and separation quantifier engine 125 determines the separation quantifier by calculating a standard deviation of remaining cluster centroids. Calculating the standard deviation in this example involves replacing a mean value of a selected cluster with a base value (defined as the value of the centroid of the cluster in a given feature) of the selected cluster.

In some embodiments, after the separation quantifier has been calculated by separation quantifier engine 125, feature importance engine 130 implemented by supervised classification engine 225 determines a feature importance of each feature for each cluster. In this example, the feature importance is enumerated by a degree of variance between features (e.g., binary features) shared by the selected cluster and the remaining clusters. As shown in FIG. 2, such an enumeration associates nodes with one or more security vulnerabilities (e.g., feature importance of security vulnerability features computed using variance of clusters directly).

In other embodiments, supervised classification engine 225 determines the separation quantifier by selecting a cluster and a feature of the cluster, defining the base value of the cluster as the centroid value of the cluster in the feature, determining a separation value between the base value and centroid values for the feature in other clusters, and determining a relative feature importance for the feature based on a coefficient measure assigned to the feature.

As previously noted, clustering algorithms, which reflect a type of unsupervised analysis, are common tools for analyzing data that does not include fields that represent intended targets for predictions or estimation. The unsupervised approach provides a method to discover underlying groups in a dataset based on some form of commonality metric without the need for any of the data points to be manually labeled. However, one major drawback of a purely unsupervised approach is that such an approach does not inherently provide a method to define the basis on which clusters are formed. Typically, and as noted, the underlying rationale for how clusters are formed are typically derived through reasoning.

Therefore, to ameliorate the shortcomings of a purely unsupervised clustering approach that does not adequately facilitate effective and meaningful cluster interpretation in an automated manner, the system of FIG. 2, which can be implemented by security server 105, provides for unsupervised clustering performed by unsupervised clustering engine 210 to be followed by supervised classification performed by supervised classification engine 225. Such a dual feature importance-based approach permits automated cluster interpretation and a determination of why certain data points that identify computing devices end up in one cluster versus another cluster as a result of standard clustering methodologies, thus permitting performance of targeted remediation (security) actions without having to subject the clustered dataset to further post-clustering processing and classification.

For example, to interpret what different clusters mean, cluster feature manager 115 first transmits features that drive the formation of clusters to unsupervised clustering engine 210. Supervised classification engine 225 then identifies the most important features that distinguish each cluster from other clusters, thus providing an automated approach to interpreting the clusters by determining the spread (e.g., degree of variance) in feature values across clusters and identifying those features that are the best at discriminating between clusters.

As previously noted, one existing approach to interpret clusters formed as the result of clustering involves processing clustering results using a classification algorithm (e.g., Random Forest Classifier) to predict the cluster assignment (derived from the clustering process) of each data point given the features of the data point—a resource-intensive task if a large amount of clustering results are involved (e.g., existing approaches rely on classifiers that provide an added layer of complexity). However, because cluster feature manager 115 provides a set of feature importances, supervised classification engine 225 uses the feature importances to rank features by importance score to systematically enumerate the underlying reasons why certain observations are assigned to particular clusters using only the variance of the clusters directly.

In certain embodiments, automating cluster interpretation using the system of FIG. 2 involves at least six steps. In step one, a clustering algorithm is executed by unsupervised clustering engine 210 to output a cluster label for each data point (e.g., in an accessed dataset). Security server 105 stores the results of the clustering and determines the centroids for each cluster (generated by the clustering). In this example, the centroid coordinates are the cluster's representative values of each feature. In step two, for each cluster, a determination is made as to how separated a given cluster is from other clusters in each (provided) feature (e.g., degree of variance). For example, a particular cluster and a particular feature are selected by separation quantifier engine 125 and the base value of the cluster is defined as the value of the cluster's centroid in the selected feature. The separation between the base value and the corresponding centroid values for the selected feature in other clusters is determined.

In one embodiment, the separation value can be determined by computing the sum of squares of the distance in the selected feature between the selected cluster and the remaining cluster followed by the taking of a square root and division by the number of clusters minus one. In another embodiment, the separation value can be determined by determining a standard deviation of the remaining cluster centroids in the selected feature with the base value of the selected cluster used in place of the mean value of the selected cluster. In these examples, the greater the separation between the given cluster and other (remaining) clusters, the more likely the selected feature distinguishes the selected cluster from the remaining clusters (e.g., determining that a given cluster is more vulnerable or less vulnerable based on a feature importance that indicates why a given node is part of the given cluster as shown in FIG. 2).

In step three, supervised classification engine 225 repeats step two for the remaining features to get the selected cluster's relative feature importances because inter-cluster separations can vary significantly when viewed from the perspective of different features. In step four, supervised classification engine 225 normalizes the aforementioned relative feature importances to determine the (actual) feature importances of the selected cluster (e.g., by converting the feature importances into fractions that sum to 1 permitting comparison across clusters). For example, supervised classification engine 225 can determine that security vulnerability 220(8) is twice as important to computing cluster 135(1) (e.g., because node 205(N)(a) is part of computing cluster 135(1)) as security vulnerability 220(1) is to computing cluster 135(2) (e.g., because node 205(1)(b) is part of computing cluster 135(2)). Finally, in step five, supervised classification engine 225 repeats steps one through five for each remaining cluster generated by unsupervised clustering engine 210.

Example Cluster Interpretation Table

FIG. 3 is a table 300 to automate cluster interpretation in security environments, according to one embodiment. Cluster interpretation table 305 includes at least a dataset field 310, a computing assets field 315, a cluster field 320, a features field 325, a separation quantifier field 330, a feature importances field 335, and a cluster interpretation field 340. Cluster interpretation table 305 can be maintained by security server 105 and can be used by cluster interpreter 120 to automate cluster interpretation in security environments.

In one embodiment, dataset 345(1) includes computing assets 140(1), 140(2), and 140(3). Unsupervised clustering engine 210 processes dataset 345(1) with clustering methodology 215(1) that results in clusters 350(1) and 350(2). Cluster feature manager 115 then transmits features 355(1) and 355(2) to separation quantifier engine 125 which determines a separation quantifier for feature 355(1) (e.g., determines how separated cluster 350(1) is from cluster 350(2) for feature 355(1)). Feature importance engine 130 then determines relative feature importances of features 355(1) and 355(2) for cluster 350(1) by generating another separation quantifier for feature 355(2) and normalizes the two separation quantifiers permitting cluster interpreter 120 to determine that feature 355(1) more than twice as important to cluster 350(1) as feature 355(2) is to cluster 350(2) after the foregoing processes are repeated for cluster 350(2).

In another embodiment, dataset 345(2) includes computing assets 140(1)-(9). Unsupervised clustering engine 210 processes dataset 345(2) with clustering methodology 215(2) that results in clusters 350(1) and 350(2). Cluster feature manager 115 then transmits features 355(1) and 355(2) to separation quantifier engine 125 which determines a separation quantifier for feature 355(2) (e.g., determines how separated cluster 350(1) is from cluster 350(2) for feature 355(2)). Feature importance engine 130 then determines relative feature importances of features 355(1) and 355(2) for cluster 350(2) by generating another separation quantifier for feature 355(1) (e.g., the remaining feature(s) for the (selected) cluster) and normalizes the two separation quantifiers permitting cluster interpreter 120 to determine that feature 355(2) is almost twice as important to cluster 350(2) as feature 355(2) is to cluster 350(1) after the foregoing processes are repeated for cluster 350(1).

Examples Processes to Automate Cluster Interpretation

As previously noted, using post-clustering mechanisms such as classifiers to interpret clustered data is laborious, resource intensive, and time consuming. These shortcomings, among others, are exacerbated in computing environments that implement cybersecurity tools because effectively analyzing user behavior data and device interaction data in a network to initialize offensive and/or defensive security measures is highly time sensitive. For example, the successful performance of security actions and/or operations associated with and/or in response to dangerous user behavior, threat probing, threat movement, remote entry, failed access attempt(s), malicious behavior on asset level, suspicious behavior on asset level, malicious behavior on network level, account adjustment, and the like, is highly dependent on quickly and effectively interpreting and evaluating clustered data while minimizing the usage of computing resource (which are required to perform such security actions and/or operations and must not be redundantly consumed or wasted by post-clustering processing).

Therefore, to ameliorate the drawbacks of implementing classifiers to perform cluster interpretation and optimize system performance in cybersecurity computing environments, security server 105 implements cluster interpreter 120 with separation quantifier engine 125 and feature importance engine 130 to automate cluster interpretation and evaluation by solely (and directly) integrating the variance in feature importances of clusters in cluster interpretation.

Figure 4:
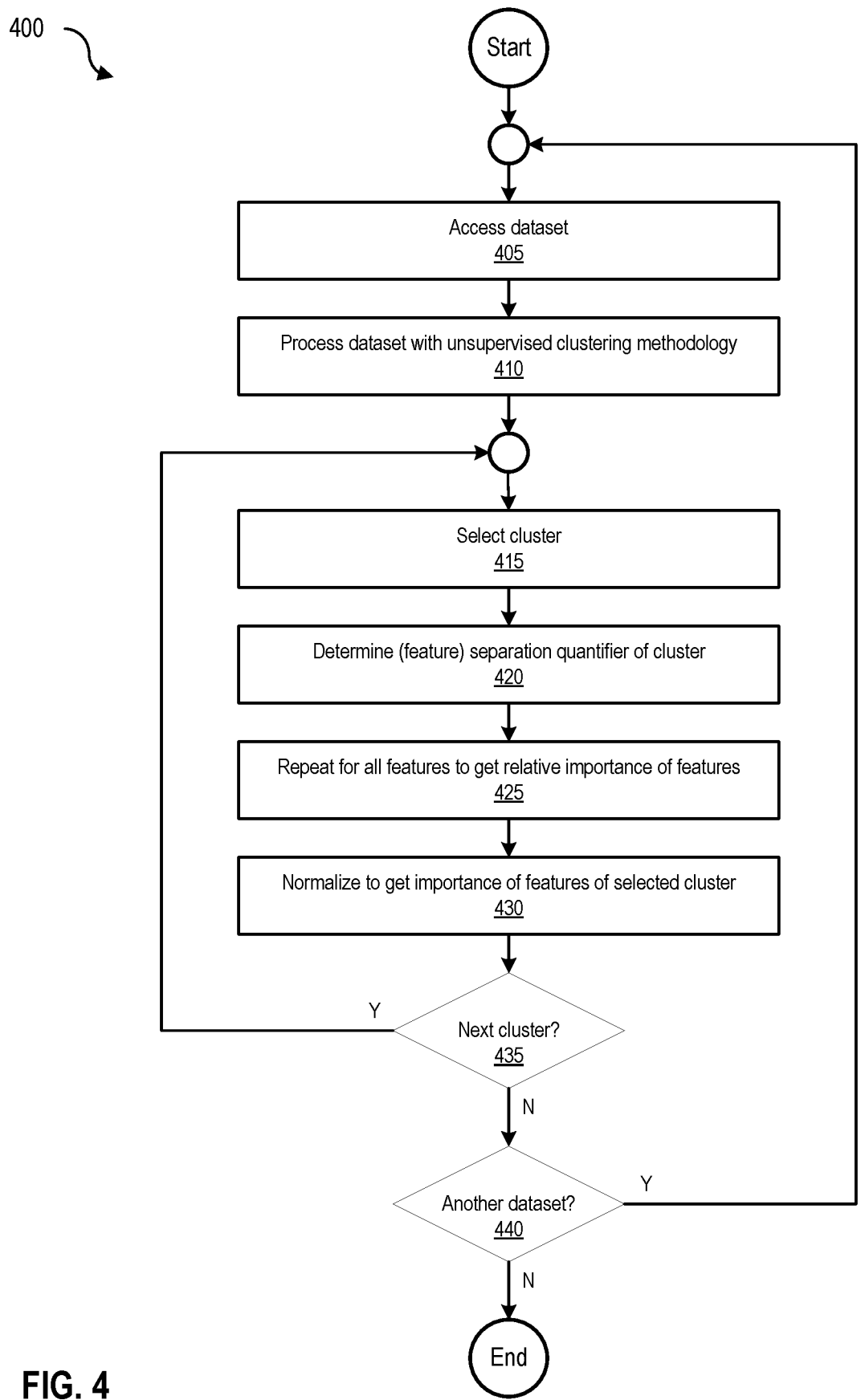
FIG. 4 is a flowchart 400 of a process to determine feature importance based on variance of clusters, according to one embodiment of the present disclosure.

FIG. 4 is a flowchart 400 of a process to determine feature importances based on variance of clusters, according to one embodiment. The process begins at 405 by accessing a dataset (e.g., cluster interpreter 120 accesses a dataset maintained by cluster data manager 110, that includes raw data and multiple data points that are each associated with an identity of a unique computing device in computing clusters 135(1)-(N)). At 410, the dataset is processed with/using an unsupervised clustering methodology (e.g., K-Means, and other comparable clustering algorithms provided by unsupervised clustering engine 210). In one embodiment, processing a dataset using an unsupervised clustering algorithm or executing an unsupervised clustering algorithm on a dataset is the first stage in automating cluster interpretation.

As part of the second stage, which initiates and implements a supervised classification approach without actually using a resource and time intensive classifier, the process, at 415, selects a cluster (e.g., a cluster with a cluster label that has been generated by the processing of the dataset using the unsupervised clustering methodology in step 410). At 420, the process determines a (feature) separation quantifier of a given feature of the selected cluster (e.g., determines how separated the selected cluster is in the selected feature from other/remaining clusters generated by the unsupervised clustering methodology).

At 425, the process repeats step 420 for the other/remaining features (of the selected cluster) to determine the relative importance of each feature (with respect to the selected cluster). Step 425 is necessary to account for inter-cluster separations that can be significantly different when examined with respect to the various features. At 430, the process normalizes the relative importance of each feature to get the (actual) feature importances of the (selected) cluster. In one embodiment, step 430 converts the determined feature importances into fractions that sum to 1 or percentages that sum to 100, permitting effective comparison (of the feature in question) across various clusters (generated by the unsupervised clustering methodology).

At 435, the process determines if there is another cluster (e.g., other/remaining clusters generated by the unsupervised clustering methodology). If there are other/remaining clusters, the process loops to 415 and repeats steps 415, 420, 425, and 430 for the next (selected) cluster. If there are no other/remaining clusters, the process, at 440, determines if there is another dataset. If there is another dataset, the process loops to 405. Otherwise, the process ends.

Figure 5:
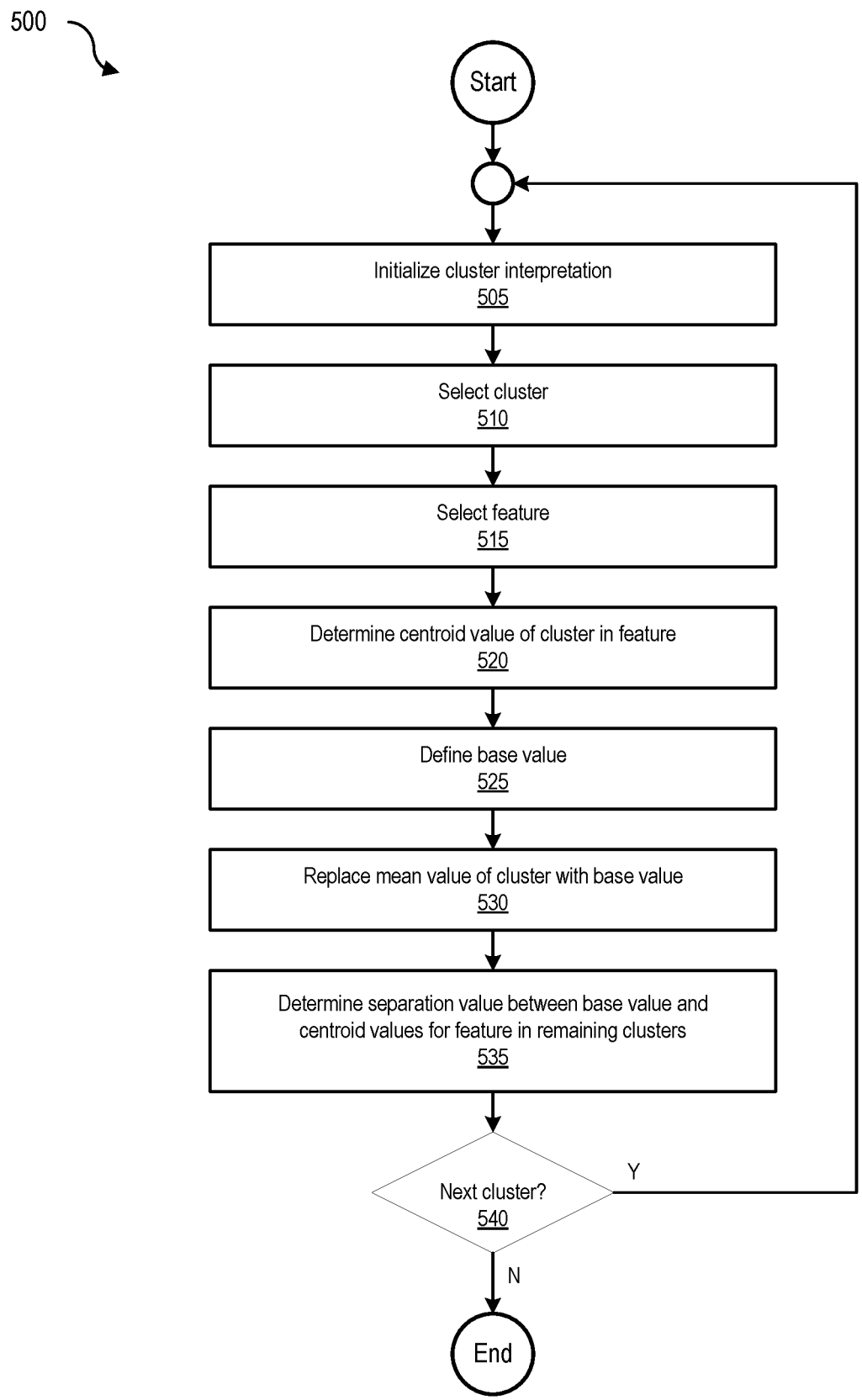
FIG. 5 is a flowchart 500 of a process to perform cluster interpretation using the spread in features across clusters, according to one embodiment of the present disclosure.

FIG. 5 is a flowchart 500 of a process to perform cluster interpretation using the spread in features across clusters, according to one embodiment. The process begins at 505 by initializing cluster interpretation, and at 510, selects a cluster (e.g., generated by an unsupervised clustering methodology). At 515, the process selects a feature, and at 520, determines a centroid value of the selected cluster in the selected feature. In one embodiment, the centroid coordinates of the selected cluster are the representative values of each feature.

To determine how separated the selected cluster is from other/remaining clusters for the selected feature, the process, at 525, defines a base value, and at 530, replaces a mean value of the selected cluster with the base value (e.g., to determine the standard deviation of the other/remaining cluster centroids in the selected feature). In this example, the base value of the selected cluster is defined as the value of the centroid of the selected cluster in the selected feature. In certain embodiments, the process determines the separation between the base value and the corresponding centroid values for the selected feature in the other/remaining clusters (e.g., by computing the sum of squares of the distance in the selected feature between the selected cluster and the other/remaining clusters, and taking the square root and dividing the result by the (total) number of clusters −1).

At 535, the process determines a separation value between the base value and the centroid values for the selected feature in the other/remaining clusters. The bigger the separation value, the better the selected feature is at distinguishing the selected cluster from the other/remaining clusters. In some embodiments, the process repeats steps 515, 520, 525, 530, and 535 for other/remaining features (if any) to determine the relative feature importances for the cluster selected in step 510 (e.g., because inter-cluster separations can be very different when seen from different features) and normalizes the relative feature importances to get the feature importances of the cluster selected in step 510 (e.g., permitting cluster interpreter 120 to determine how much more important or how much less important a given feature is to a given cluster compared to another given feature to another given cluster).

At 540, the process determines if there is another cluster (e.g., other/remaining cluster(s)). If there is another cluster, the process loops to 505 and repeats steps 505 through 535 for the (next) selected cluster. If there is no other/remaining cluster, the process ends.

Therefore, to interpret what different clusters mean, the foregoing processes focus on features that drive the formation of clusters, identify the most important features that distinguish the clusters from each other, and provide an automated approach to interpreting the clusters by computing the spread in feature values across the clusters and identifying those features that are the best at discriminating between the clusters. By doing so, the methods, systems, and processes disclosed herein perform automated cluster interpretation in security environments.

Example of Configuring Targeted Remediation Security Actions

In one embodiment, a Security Operations (SecOps) and/or information technology (IT) professional can utilize clustering results generated by an unsupervised clustering methodology to determine whether a particular (selected) cluster has a significantly higher incidence of a given (selected) feature (e.g., the number of computing assets with up-to-date patching), thus permitting interpretation and evaluation of collective properties of the selected cluster. For example, the systems, methods, and processes associated with cluster interpreter 120 and discussed herein can enable the SecOps and/or IT professional to determine why a given cluster was formed as well as identify a given feature that is the most important feature that set the given cluster apart from other/remaining clusters.

In certain embodiments, separation quantifier engine 125 and feature importance engine 130 can enable the configuring of a targeted remediation security action by determining that a significant presence of a certain software process or the lack of up-to-date patching (e.g., features) on a computing device indicates that the computing device belongs to a local sales person at the company (and hence should be treated differently with respect to provisioning computing resources for security operations, for example, from a computing device belonging to an international corporate executive).

As previously noted, existing options to perform post-clustering processing for cluster interpretation involve at least (1) manually inspecting the derived clusters and assigning cluster labels (e.g., "Cluster X appears to be a Sales machines cluster") and (2) using a classifier. Unfortunately, also as noted, in addition to redundant time and resource utilization, classifiers require setup and training and thus involve the risk of sub-standard (or incorrect) performance.

Therefore, the methods, systems, and processes described and disclosed herein improve and optimize cluster interpretation to configure targeted remediation security actions while accounting for the drawbacks of traditional classifiers. Performing such automated cluster interpretation using the variance of clusters directly (vis-a-vis a given feature) can enable SecOps or IT professional to determine how to (best) tailor and/or develop a targeted remediation security action based on the properties of a given cluster.

Example Computing Environment

Figure 6:
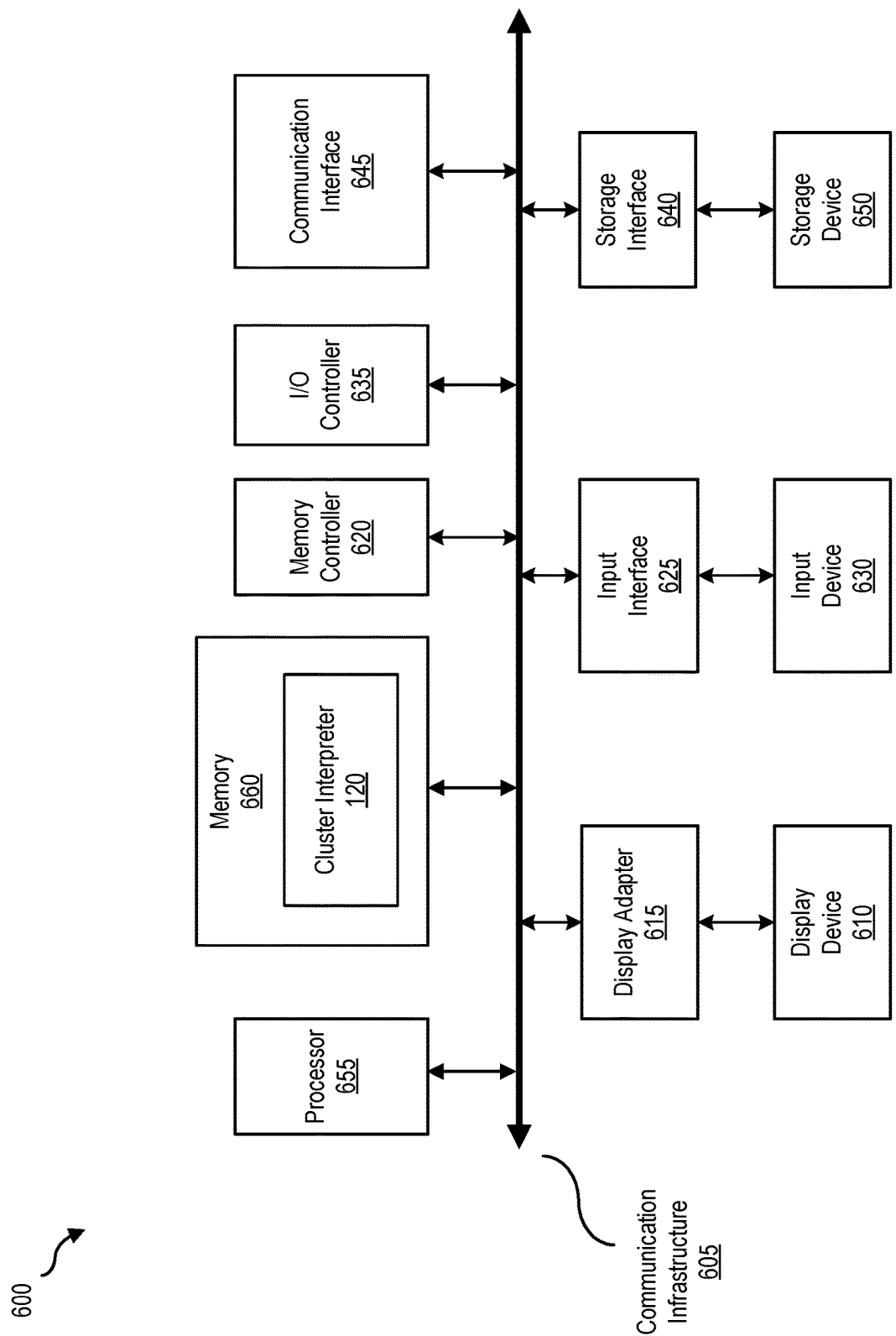
FIG. 6 is a block diagram 600 of a computing system, illustrating how a cluster interpreter can be implemented in software, according to one embodiment of the present disclosure.

FIG. 6 is a block diagram 600 of a computing system, illustrating how a cluster interpreter can be implemented in software, according to one embodiment. Computing system 600 can include security server 105 and broadly represents any single or multi-processor computing device or system capable of executing computer-readable instructions. Examples of computing system 600 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 600 may include at least one processor 655 and a memory 660. By executing the software that implements cluster interpreter 120, computing system 600 becomes a special purpose computing device that is configured to automate cluster interpretation in security environments.

Processor 655 generally represents any type or form of processing unit capable of processing data or interpreting and executing instructions. In certain embodiments, processor 655 may receive instructions from a software application or module. These instructions may cause processor 655 to perform the functions of one or more of the embodiments described and/or illustrated herein. For example, processor 655 may perform and/or be a means for performing all or some of the operations described herein. Processor 655 may also perform and/or be a means for performing any other operations, methods, or processes described and/or illustrated herein. Memory 660 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 600 may include both a volatile memory unit and a non-volatile storage device. In one example, program instructions implementing cluster interpreter 120 may be loaded into memory 660.

In certain embodiments, computing system 600 may also include one or more components or elements in addition to processor 655 and/or memory 660. For example, as illustrated in FIG. 6, computing system 600 may include a memory controller 620, an Input/Output (I/O) controller 635, and a communication interface 645, each of which may be interconnected via a communication infrastructure 605. Communication infrastructure 605 generally represents any type or form of infrastructure capable of facilitating communication between one or more components of a computing device. Examples of communication infrastructure 605 include, without limitation, a communication bus (such as an Industry Standard Architecture (ISA), Peripheral Component Interconnect (PCI), PCI express (PCIe), or similar bus) and a network.

Memory controller 620 generally represents any type/form of device capable of handling memory or data or controlling communication between one or more components of computing system 600. In certain embodiments memory controller 620 may control communication between processor 655, memory 660, and I/O controller 635 via communication infrastructure 605. In certain embodiments, memory controller 620 may perform and/or be a means for performing, either alone or in combination with other elements, one or more of the operations or features described and/or illustrated herein. I/O controller 635 generally represents any type or form of module capable of coordinating and/or controlling the input and output functions of a computing device. For example, in certain embodiments I/O controller 635 may control or facilitate transfer of data between one or more elements of computing system 600, such as processor 655, memory 660, communication interface 645, display adapter 615, input interface 625, and storage interface 640.

Communication interface 645 broadly represents any type/form of communication device/adapter capable of facilitating communication between computing system 600 and other devices and may facilitate communication between computing system 600 and a private or public network. Examples of communication interface 645 include, a wired network interface (e.g., network interface card), a wireless network interface (e.g., a wireless network interface card), a modem, and any other suitable interface. Communication interface 645 may provide a direct connection to a remote server via a direct link to a network, such as the Internet, and may also indirectly provide such a connection through, for example, a local area network. Communication interface 645 may also represent a host adapter configured to facilitate communication between computing system 600 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 600 may also include at least one display device 610 coupled to communication infrastructure 605 via a display adapter 615 that generally represents any type or form of device capable of visually displaying information forwarded by display adapter 615. Display adapter 615 generally represents any type or form of device configured to forward graphics, text, and other data from communication infrastructure 605 (or from a frame buffer, as known in the art) for display on display device 610. Computing system 600 may also include at least one input device 630 coupled to communication infrastructure 605 via an input interface 625. Input device 630 generally represents any type or form of input device capable of providing input, either computer or human generated, to computing system 600. Examples of input device 630 include a keyboard, a pointing device, a speech recognition device, or any other input device.

Computing system 600 may also include storage device 650 coupled to communication infrastructure 605 via a storage interface 640. Storage device 650 generally represents any type or form of storage devices or mediums capable of storing data and/or other computer-readable instructions. For example, storage device 650 may include a magnetic disk drive (e.g., a so-called hard drive), a floppy disk drive, a magnetic tape drive, an optical disk drive, a flash drive, or the like. Storage interface 640 generally represents any type or form of interface or device for transmitting data between storage device 650, and other components of computing system 600. Storage device 650 may be configured to read from and/or write to a removable storage unit configured to store computer software, data, or other computer-readable information. Examples of suitable removable storage units include a floppy disk, a magnetic tape, an optical disk, a flash memory device, or the like. Storage device 650 may also include other similar structures or devices for allowing computer software, data, or other computer-readable instructions to be loaded into computing system 600. For example, storage device 650 may be configured to read and write software, data, or other computer-readable information. Storage device 650 may also be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from that shown in FIG. 6. Computing system 600 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 600 for storage in memory via a network such as the Internet or upon a carrier medium.

The computer-readable medium containing the computer program may be loaded into computing system 600. All or a portion of the computer program stored on the computer-readable medium may then be stored in memory 660, and/or various portions of storage device 650. When executed by processor 655, a computer program loaded into computing system 600 may cause processor 655 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 7:
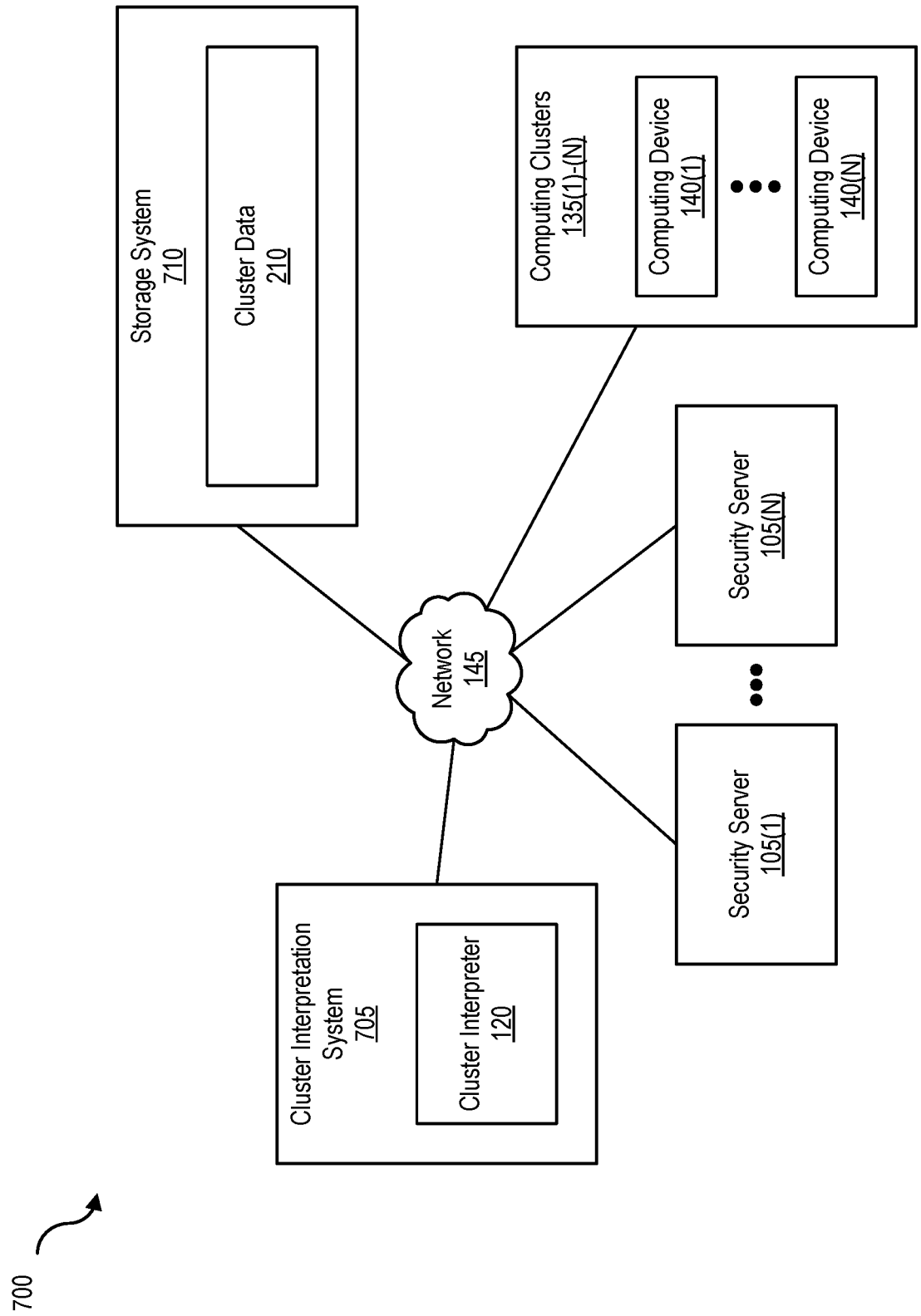
FIG. 7 is a block diagram 700 of a networked system, illustrating how various devices can communicate via a network, according to one embodiment of the present disclosure.

FIG. 7 is a block diagram of a networked system, illustrating how various computing devices can communicate via a network, according to one embodiment. Network 145 generally represents any type or form of computer network or architecture capable of facilitating communication between security server 105 and computing clusters 135(1)-(N). For example, network 145 can be a Wide Area Network (WAN) (e.g., the Internet), a Local Area Network (LAN), or any other type of interconnection.

In certain embodiments, a communication interface, such as communication interface 645 in FIG. 6, may be used to provide connectivity between security server 105 and computing clusters 135(1)-(N), and network 145. The embodiments described and/or illustrated herein are not limited to the Internet or any particular network-based environment.

In some embodiments, cluster interpretation system 705 may be part of security server 105, or may be separate. If separate, cluster interpretation system 705 and security server 105 may be communicatively coupled via network 145. In one embodiment, all or a portion of one or more of the disclosed embodiments may be encoded as a computer program and loaded onto and executed by cluster interpretation system 705 and security server 105, or any combination thereof, and may be stored on cluster interpretation system 705 or security server 105, and distributed over network 145.

In some examples, all or a portion of cluster interpretation system 705 and security server 105 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, cluster interpreter 120 may transform the behavior of cluster interpretation system 705 or security server 105 to automate cluster interpretation in security environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method for automating cluster interpretation in a cybersecurity environment, the computer-implemented method comprising:
   accessing a dataset generated by a plurality of computing devices;
   executing an unsupervised clustering methodology on the dataset;
   executing, without using a classifier, a supervised classification methodology, wherein the executing the supervised classification methodology comprises:
      determining a separation quantifier that indicates variance between a plurality of features shared by each cluster of a plurality of clusters generated by the unsupervised clustering methodology, wherein each feature of the plurality of features is a security vulnerability of a plurality of security vulnerabilities associated with one or more computing devices of the plurality of computing devices; and
      determining a feature importance of each feature of the plurality of features for each cluster of the plurality of clusters; and
   configuring a targeted remediation security action for the one or more computing devices based on the feature importance of each feature indicating variance between each cluster of the plurality of clusters.

2. The computer-implemented method of claim 1, wherein
   the dataset comprises a plurality of data points, and
   the execution of the unsupervised clustering methodology generates a cluster label for each data point of the plurality of data points.

3. The computer-implemented method of claim 2, further comprising:
   determining a centroid value for each cluster.

4. The computer-implemented method of claim 3, wherein determining the separation quantifier further comprises:
   (a) selecting a first cluster and a first feature of a plurality of features of the first cluster,
   (b) defining a base value of the first cluster based on a first centroid value of the first cluster in the first feature,
   (c) determining a separation value between the base value and a plurality of centroid values for the first feature in each cluster other than the first cluster, and
   (d) determining a relative feature importance of each feature for the first cluster by repeating (a), (b), and (c) for each feature of the plurality of features other the first feature.

5. The computer-implemented method of claim 4, further comprising:
   normalizing the relative feature importance of each feature to determine the feature importance of each feature.

6. The computer-implemented method of claim 5, wherein determining the separation value, further comprises replacing a mean value of the first cluster with the base value of the first cluster.

7. A non-transitory computer readable storage medium with program instructions executable to automate cluster interpretation in a cybersecurity environment and configure a targeted remediation security action, comprising:
   accessing a dataset generated by a plurality of computing devices, wherein
      the dataset comprises a plurality of data points, and
      a first data point of the plurality of data points is associated with an identity of a computing device of a plurality of identities of the plurality of computing devices;
   processing the dataset with an unsupervised clustering methodology;
   performing, without using a classifier, a supervised classification methodology, wherein the performing the supervised classification methodology comprises:
      determining a separation quantifier that indicates a degree of variance for a plurality of features shared by each cluster of a plurality of clusters generated by the unsupervised clustering methodology, wherein:
         determining the separation quantifier comprises determining a standard deviation of each cluster other than a selected cluster of the plurality of clusters by replacing a mean value of the selected cluster with a base value of the selected cluster, and
         each feature of the plurality of features is a security vulnerability of a plurality of security vulnerabilities associated with the computing device; and
      determining a feature importance of each feature of the plurality of features for each cluster of the plurality of clusters; and
   determining whether a selected feature of the plurality of features separates the selected cluster from each cluster other than the selected cluster based on the degree of variance and a corresponding feature importance of the selected feature; and
   configuring the targeted remediation security action for the computing device based on the corresponding feature importance enumerated by the degree of variance between the plurality of features shared by the selected cluster and one or more other clusters of the plurality of clusters.

8. The non-transitory computer readable storage medium of claim 7, wherein at least one feature of the plurality of features is a binary feature.

9. The non-transitory computer readable storage medium of claim 7, wherein determining the separation quantifier, further comprises:
   selecting the selected cluster and the selected feature,
   defining the base value of the selected cluster based on a centroid value of the selected cluster in the selected feature, determining a separation value between the base value and a plurality of centroid values for the selected feature in each cluster other than the selected cluster, and determining a relative feature importance of the selected feature based on a coefficient measure assigned to the selected feature.

10. The non-transitory computer readable storage medium of claim 7, wherein configuring the targeted remediation security action comprises:
an unsupervised clustering methodology, and
a supervised classification methodology performed without using a classifier.

11. A system comprising:
one or more processors; and
a memory coupled to the one or more processors, wherein the memory stores program instructions executable by the one or more processors to automate cluster interpretation in a cybersecurity environment and configure a targeted remediation security action by:
accessing a dataset generated by a plurality of computing devices, wherein:
the dataset comprises a plurality of data points, and
a first data point of the plurality of data points is associated with an identity of a computing device of a plurality of identities of the plurality of computing devices;
processing the dataset with an unsupervised clustering methodology;
performing, without using a classifier, a supervised classification methodology, wherein the performing the supervised classification methodology comprises:
determining a separation quantifier that indicates a degree of variance for a plurality of features shared by each cluster of a plurality of clusters generated by the clustering methodology, wherein:
determining the separation quantifier comprises determining a standard deviation of each cluster other than a selected cluster of the plurality of clusters by replacing a mean value of the selected cluster with a base value of the selected cluster, and
each feature of the plurality of features is a security vulnerability of a plurality of security vulnerabilities associated with the computing device; and
determining a feature importance of each feature of the plurality of features for each cluster of the plurality of clusters; and
determining whether a selected feature of the plurality of features separates the selected cluster from each cluster other than the selected cluster based on the degree of variance and a corresponding feature importance of the selected feature; and
configuring the targeted remediation security action for the computing device based on the corresponding feature importance enumerated by the degree of variance between the plurality of features shared by the selected cluster and one or more other clusters of the plurality of clusters.

12. The system of claim 11, wherein at least one feature of the plurality of features is a binary feature.

13. The system of claim 11, wherein determining the separation quantifier, further comprises:

selecting the selected cluster and a selected feature of the plurality of features of the selected cluster,
defining the base value of the selected cluster based on a centroid value of the selected cluster in the selected feature,
determining a separation value between the base value and a plurality of centroid values for the selected feature in each cluster other than the selected cluster, and
determining a relative feature importance of the selected feature based on a coefficient measure assigned to the selected feature.

14. The system of claim 11, further comprising:
determining the centroid value for the selected cluster, wherein the base value of the selected cluster is the centroid value of the selected cluster in the selected feature.

15. The computer-implemented method of claim 1, wherein the unsupervised clustering methodology comprises at least one of:
K-Means clustering;
Agglomerative clustering;
Mean-Shift clustering;
Density-based spatial clustering; or
Expectation Maximization clustering.

16. The computer-implemented method of claim 1, wherein the dataset comprises at least one of:
dangerous user behavior data;
threat probing data;
threat movement data;
remote entry data;
failed access attempt data;
malicious behavior on asset level data;
suspicious behavior on asset level data;
malicious behavior on network level data; or
account adjustment data.

17. The non-transitory computer readable storage medium of claim 7, wherein the unsupervised clustering methodology comprises at least one of:
K-Means clustering;
Agglomerative clustering;
Mean-Shift clustering;
Density-based spatial clustering; or
Expectation Maximization clustering.

18. The non-transitory computer readable storage medium of claim 7, wherein the dataset comprises at least one of:
dangerous user behavior data;
threat probing data;
threat movement data;
remote entry data;
failed access attempt data;
malicious behavior on asset level data;
suspicious behavior on asset level data;
malicious behavior on network level data; or
account adjustment data.

19. The system of claim 11, wherein the unsupervised clustering methodology comprises at least one of:
K-Means clustering;
Agglomerative clustering;
Mean-Shift clustering;
Density-based spatial clustering; or
Expectation Maximization clustering.

20. The system of claim 11, wherein the dataset comprises at least one of:
dangerous user behavior data;
threat probing data;
threat movement data;

remote entry data;
failed access attempt data;
malicious behavior on asset level data;
suspicious behavior on asset level data;
malicious behavior on network level data; or
account adjustment data.

\* \* \* \* \*